Nov. 7, 1944.  T. E. STAIR  2,361,977
MERCHANDISE AND PREMIUM VENDING MACHINE
Filed Jan. 11, 1941  5 Sheets-Sheet 1
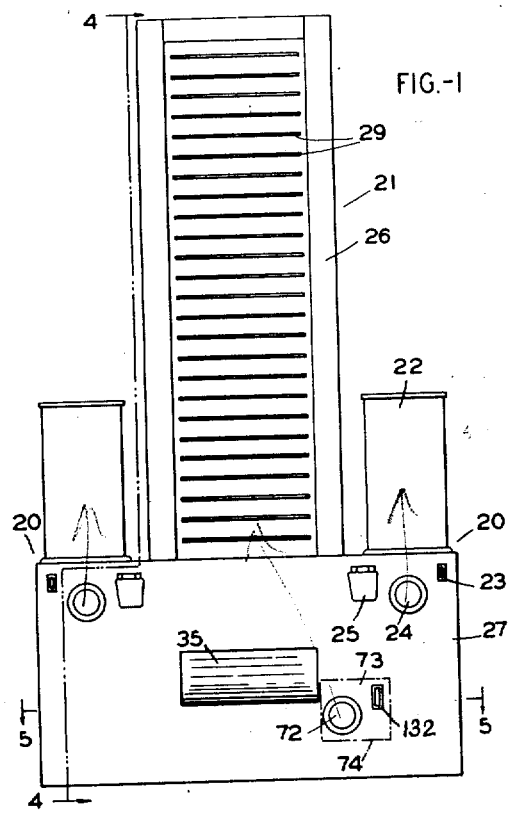
FIG.-1
FIG.-2
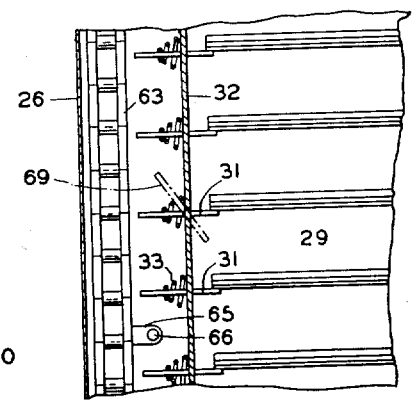
FIG.-3
INVENTOR
TROY E. STAIR
BY
Hyde and Meyer
ATTORNEYS Nov. 7, 1944.  T. E. STAIR  2,361,977
MERCHANDISE AND PREMIUM VENDING MACHINE
Filed Jan. 11, 1941  5 Sheets-Sheet 2
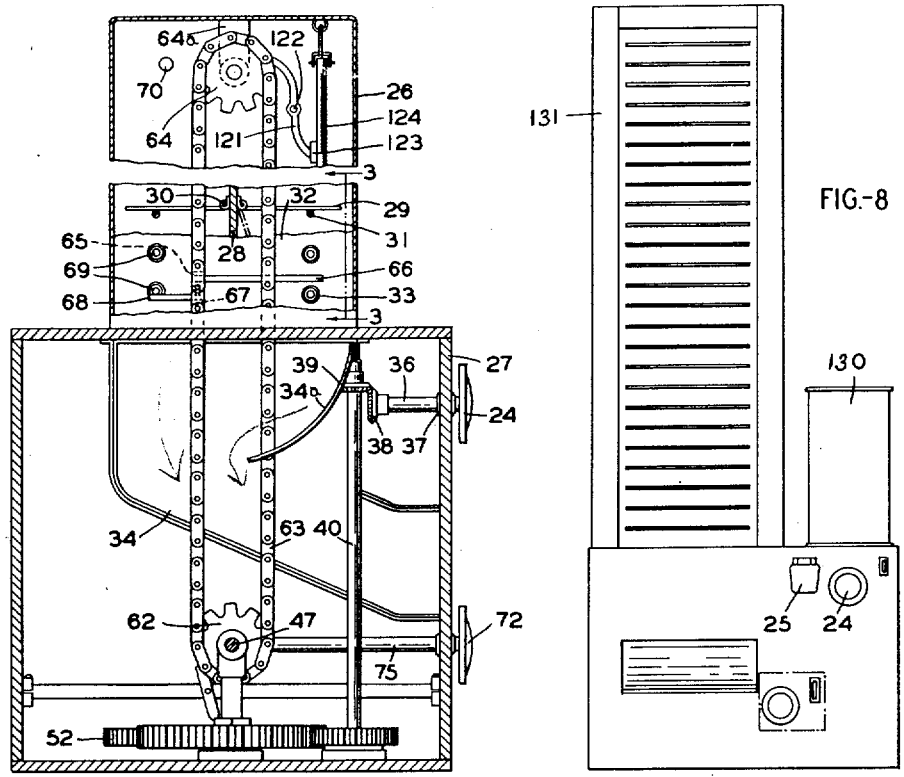
FIG.-4
FIG.-8
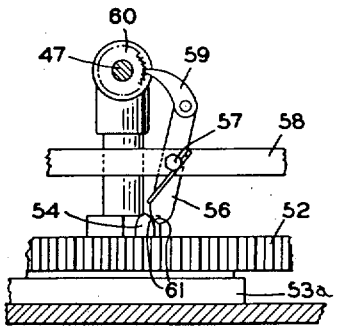
FIG.-6
FIG.-7
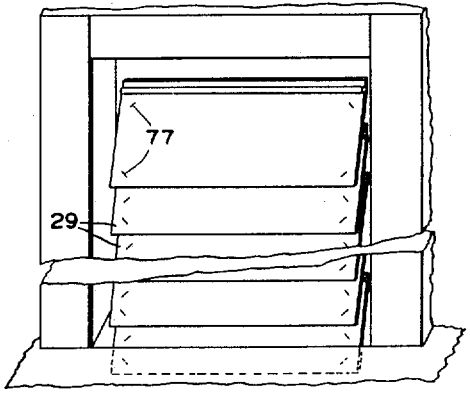
INVENTOR
TROY E. STAIR
BY
Hyde and Meyer
ATTORNEYS

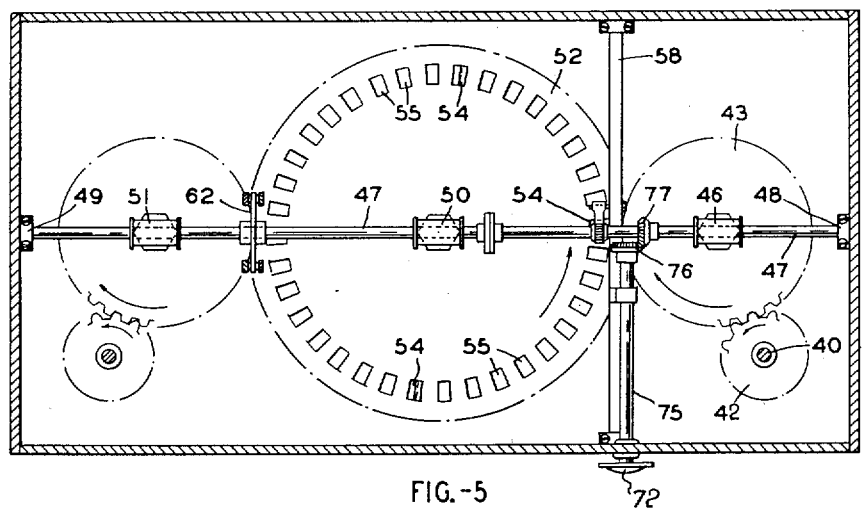
FIG.-5
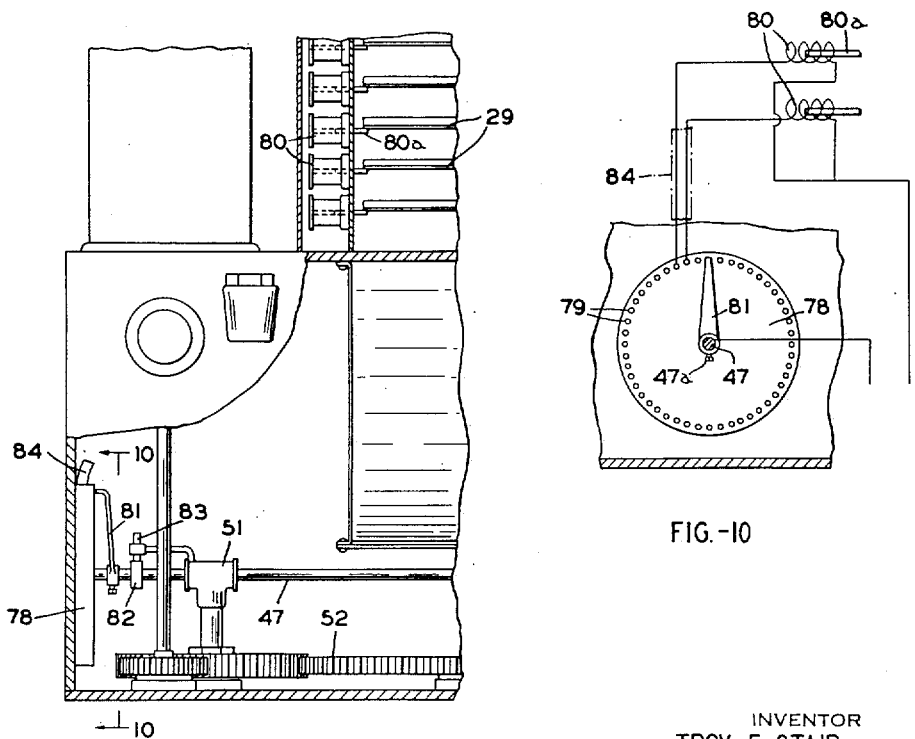
FIG.-9
FIG.-10
INVENTOR
TROY E. STAIR

Nov. 7, 1944.                T. E. STAIR                2,361,977
             MERCHANDISE AND PREMIUM VENDING MACHINE
                    Filed Jan. 11, 1941        5 Sheets-Sheet 4
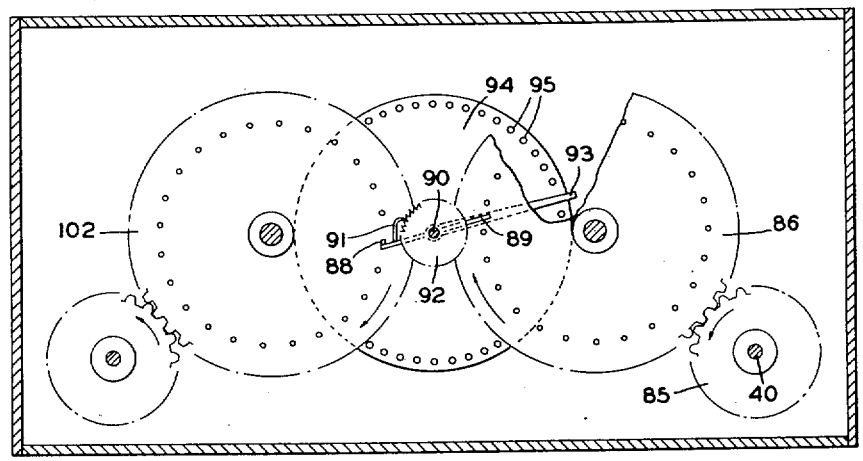
FIG.-12
FIG.-11
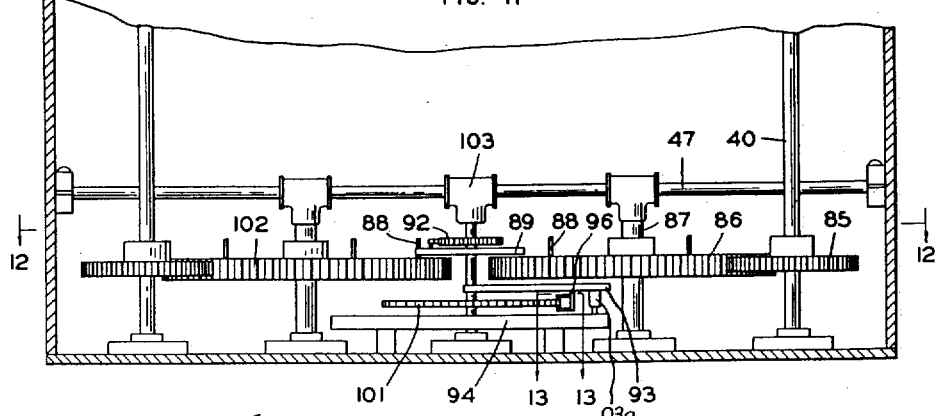
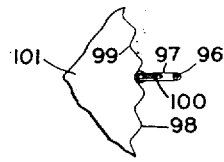
FIG.-13
INVENTOR
TROY E. STAIR
BY
  Hyde and Meyer
       ATTORNEYS Nov. 7, 1944.                T. E. STAIR                 2,361,977
             MERCHANDISE AND PREMIUM VENDING MACHINE
                    Filed Jan. 11, 1941       5 Sheets-Sheet 5

INVENTOR
TROY E. STAIR
BY
ATTORNEYS

Patented Nov. 7, 1944

2,361,977

UNITED STATES PATENT OFFICE 2,361,977

MERCHANDISE AND PREMIUM VENDING MACHINE

Troy E. Stair, Cleveland, Ohio

Application January 11, 1941, Serial No. 374,038

9 Claims. (Cl. 312—94)

The invention relates to a coin operated vending machine. It is specifically directed to a machine of this nature constructed to regularly dispense merchandise, when coin actuated, and to intermittently dispense premium articles to purchasers of said merchandise at intervals which are unpredictable by the purchaser although inevitably resulting from certain prearranged sequences of purchases.

Vending machines have heretofore been devised which are coin operated, and which intermittently display a visible indication that a premium may be obtained from an employee of the establishment where the machine is located. The present machine is an improvement thereon in that it is completely self-contained since it automatically delivers the premium at the moment the operator makes the purchase, and requires no reference to the owner or employee of the establishment or elsewhere. It may therefore be used where constant attendance is inconvenient or impossible, with a consequent minimum of trouble to the purchaser and owner.

In a preferred embodiment the machine comprises three separate units which are interdependent to the extent that two of these units are coin operated dispensing machines of fairly conventional form, but either of these two units, on being operated by insertion of a coin, sets in motion mechanism which, after one or more operations, causes the third unit, hereinafter known as the premium unit, to release a premium to an outlet available to the purchasing operator. It will be obvious, on examination of the drawings later to be described in conjunction with the present specification, that only one coin operated unit, hereinafter known as a merchandising unit, is sufficient to adequately operate the premium unit. The purchaser's interest is heightened, however, and his uncertainty as to the prospects of an immediate premium is intensified, by the use of two or more merchandising units in operative conjunction with at least one premium unit. It is further possible, and is within the purview of ordinary mechanical skill upon consideration of the description and drawings herein, to devise interesting combinations wherein a plurality of merchandising units are operatively associated with a plurality of premium units. A multiplication of units such as just mentioned not only adds to the interest and suspense of the purchaser, but also permits the display and sale of a greater variety of vendible products, as well as a variety of selection of premiums. For simplicity and convenience, however, I have illustrated several embodiments showing the operative association between one or two merchandising units and one premium unit which serves to illustrate the general principle involved.

It may occasionally be desirable to convert the premium unit to a merchandising unit which may be coin operated in a conventional manner. I have provided mechanism whereby such conversion may be rapidly and easily effected by a single simple operation so that the mechanism will function as a plurality of direct merchandising units until it is desired to again convert it to an intermittent premium dispensing arrangement. While operating as a premium dispensing device, it may be slightly modified to prevent the insertion of a coin in the premium unit.

I have devised and hereinafter describe a structure which may be actuated, solely, by a simple impetus supplied by the operator, as by turning a knob or pushing a plunger. I have further devised and will hereinafter describe a structure which combines both mechanical and electrical actuation. As will appear, electrification of the apparatus may be substantially complete, or some operations may be performed mechanically, resulting in the completion of electrical circuits which induce further mechanical actuations. In any event the operating mechanism is extremely simple to construct and maintain in continuous successful operation.

An object of the apparatus, therefore, is the provision of a combined merchandise vending and premium dispensing machine wherein the premium is delivered automatically to the operator.

A further object is the provision of a machine of this nature wherein one or more merchandising units may be combined in operative relationship with one or more premium units.

A further object is the provision of a machine of this nature wherein the premium unit may be readily converted to a merchandising unit.

A further object is the provision of a machine of this nature wherein the additive effects of successive operations of one or more merchandising units causes predetermined actuation of the premium unit, but wherein the sequence and period of successive actuations is unknown to the operator.

A further object is the provision of a machine of this nature wherein, by a simple operation, the sequence combination for determining the operational periods of the premium unit may be predetermined by the owner or lessee of the machine.

A further object is the provision of a machine of this nature wherein the operating mechanism to fulfill the above mentioned objects may be mechanically and/or electrically operated.

Other objects and advantages will become apparent from a consideration of the following description in conjunction with the attached drawings, in which Fig. 1 is a front elevation of one embodiment of my invention showing a vending machine in which are combined two merchandising units and one premium unit, the latter being optionally convertible into an additional merchandising unit.

Fig. 2 is a somewhat enlarged view, in front elevation, of the lower portion of the machine shown in Fig. 1, the front cover being removed to show a part of the operating mechanism.

Fig. 3 is a sectional view, taken on the line 3—3 of Fig. 4.

Fig. 4 is a vertical section taken on the line 4—4 of Fig. 1, parts being broken away.

Fig. 5 is a horizontal section taken on the line 5—5 of Fig. 1.

Fig. 6 is a vertical section, somewhat enlarged, taken on the line 6—6 of Fig. 2.

Fig. 7 is a front elevation of the upper portion of the premium cabinet, the front cover being removed and parts being broken away, to show the arrangement when the shelves are empty.

Fig. 8 is a front elevation of another embodiment of my invention, showing one premium unit in conjunction with one vending unit, the premium unit being optionally convertible into a vending unit.

Fig. 9 shows yet another embodiment of my invention, in fragmentary front elevation, the cover being partially broken away, to illustrate a device in which a part of the operation is electrically energized.

Fig. 10 is a section taken on the line 10—10 of Fig. 9.

Fig. 11 is a fragmentary front elevation, with cover removed, of the lower portion of yet another embodiment of my invention illustrating substantially complete electrical energization, using two independent premium wheels instead of the one wheel shown in Fig. 5.

Fig. 12 is a section taken on the line 12—12 of Fig. 11.

Fig. 13 is a section taken on the line 13—13 of Fig. 11.

Figure 15:
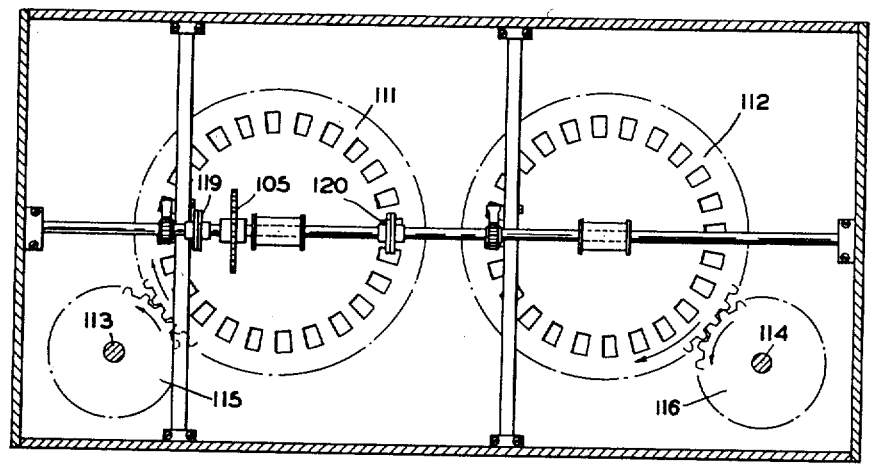
Fig. 15 is a section on the line 15—15 of Fig. 14.

The invention will first be described with reference to the embodiment shown in Figs. 1 to 7 which illustrate what I term, for convenience, mechanical operation, manually actuated. The embodiment shown in the drawings, and now to be described, has two merchandising units which are coin operated in the conventional manner, and one premium unit which may optionally be converted, by a simple operation, to an additional merchandising unit, although ordinarily it serves as a premium dispensing unit intermittently operated by actuation of the merchandising units, as described hereinbelow. It should be borne in mind that although the invention is now described with reference to the embodiments shown, it is not in its broader aspects limited thereto, and the present mechanically operated machine, and the later described machines which are either partially or completely electrically operated, may be constructed to comprise one or more merchandising units in operative relationship with one or more premium dispensing units, as will be obvious to any skilled mechanic after consideration of the drawings in conjunction with the description herein.

Complete mechanical operation

Referring first to Figs. 1 to 7, the vending machine therein shown comprises two merchandising units indicated generally at 20 and a premium unit 21 (Fig. 1). The merchandising unit is conventionally constructed, except as hereinafter otherwise indicated, and includes a merchandise container 22 to hold nuts, candy, or other conveniently vendible commodity. It is further provided with a coin slot 23 and a member, shown herein as a knob 24, for actuating the device after insertion of the coin, as is well understood. It is not herein necessary to show or describe the well known constructions wherein an inserted coin serves as a key or otherwise operatively takes part in the delivery of a predetermined quantity of merchandise since a number of mechanical devices and methods of operation are already known which perform this function and any operative mechanism is quite satisfactory. Upon actuation of the unit the merchandise may be delivered in any familiar manner, and a receiving cup 25 is illustrated in Fig. 1.

Referring now to Figs. 1, 3, and 4, the premium unit 21 includes a housing 26, mounted on a hollow cabinet base 27 which also carries the merchandising units 20. A central partition 28 extends through the major portion of the height of the housing and carries, on its front and rear surfaces, a plurality of shelves 29 which are hinged, as at 30, to partition 28. Ordinarily the shelves are supported, at a location spaced from the hinge, by swivel pins 31, which pins extend inwardly through a lateral vertical partition 32 and are resiliently retained in pivotal relationship around their point of passage through the partition by spring means 33 (Figs. 3 and 4). When a pin is tilted, by means hereinafter to be described, the shelf drops and any object contained on the shelf, and in the present instance a candy bar or other commodity, drops through an aperture in the top of the base cabinet 27 into a chute 34, the delivery zone of which is available to a purchaser by means of an aperture 35 in the front cover of the base cabinet. Another chute 34a, shown in Fig. 4, is provided to cooperate with chute 34 in delivering premiums. While the merchandising units, 20, may optionally be constructed at least in part of transparent material to enable the purchaser to see the commodity he is purchasing, the premium cabinet 21 preferably carries a transparent front cover to give the purchaser an opportunity to appraise the character of the premium which he may anticipate.

The operative association between the premium unit and the merchandising unit or units will now be described, still referring to Figs. 1 to 7. The knob 24 associated with the coin slot of a merchandising unit 20 is affixed to a shaft 36 which is rotatably mounted in a suitable bushing 37 in the front wall of the cabinet 27. At its inner end shaft 36 carries a bevel gear 38 which is in mesh with a corresponding bevel gear 39 affixed to a vertical shaft 40 whereby rotation of knob 24 is transmitted to shaft 40 (Fig. 4). Shaft 40 is journaled at its opposite ends in end bearings in the top and bottom of the base cabinet interior, the lower end bearing 41 being shown in Fig. 2. Shaft 40 has affixed thereto a gear 42 which is in mesh with an idler gear 43 rotatably carried on a vertical shaft 44 attached at its lower end on the cabinet base, at 45, and at its upper end in a T coupling 46, said coupling having rotatably mounted therein at right angles to shaft 44, a cross shaft 47 the function of which will be later described. Gear 43, being an idler gear, may rotate on shaft 44, or shaft 44 may rotate, the gear 43 being attached thereto. I prefer that shaft 44 be firmly fixed in the base, as by a threaded connection in the flange 45. Cross shaft 47 is supported at its ends in removable end bearings 48 and 49 (Figs. 2 and 5) carried by the cabinet walls and shaft 47 passes through suitable collar bearings in T coupling 46, as aforesaid, and in additional T couplings 50 and 51, as later described.

Gear 43 meshes with a geared premium wheel 52 which is rotatably mounted on a shaft 53 which also is fixed to the base at 53a as previously described with relation to shaft 44. The upper end of shaft 53 carries a T coupling 50 containing a collar bearing for shaft 47.

The top face of premium wheel 52 has upon its upper, outer periphery means for holding in position any selected number of keys 54. These keys may be removably fixed, as shown, in suitable grooves 55, or in bored apertures, or otherwise held in any convenient manner which permits of periodic changes in the "combination" or arrangement of the keys by a service man as will soon be understood. A swinging arm 56 is pivotally mounted at 57 on a cross bar 58, the cross bar being conveniently affixed by removable brackets to the front and rear walls of the cabinet and serving also as a brace therefor. The swinging arm carries on its upper end a pawl 59 which engages with a ratchet wheel 60 firmly attached to shaft 47. By reference to Fig. 6 it will appear that if the gear 52 be rotated towards the right, the key 54, on reaching swinging arm 56, will cause arm 56 to move counterclockwise, the mutually cooperating beveled faces 61 sliding on each other in cam and follower relationship, and causing the pawl 59 to advance the ratchet 60 a predetermined amount depending on various factors well understood by skilled mechanics, said factors including the spacing of the ratchet teeth, and the length of swing of the pawl-carrying arm. Since the ratchet wheel is attached to shaft 47, the movements detailed immediately hereinabove, and induced by passage of a key under arm 56, will result in a proportionate rotation of shaft 47. It will be further apparent that the spacing and the number of keys 54 carried by premium wheel 52 determines the frequency of actuation of the ratchet, pawl, and shaft 47, which in turn controls the delivery of a premium in a manner now to be described.

Referring now to Figs. 2, 3, and 4, shaft 47 has affixed thereto a sprocket wheel 62 which meshes with a chain belt 63, this chain drive at its upper extremity, passing over another sprocket wheel 64 mounted on a bracket 64a which is suspended from the inner top portion of the premium unit 21 or otherwise suitably carried within the upper portion of the premium unit. Each rotation of shaft 47 by means of pawl 59 as aforesaid advances the chain a predetermined increment of length.

A bracket 65 is carried by chain 63 (Fig. 3) and said bracket, in turn, carries a projecting rod or arm member 66 which extends towards the front of the premium unit housing. Another bracket, shown in dotted line at 67 in Fig. 4, carries another arm 68 which extends towards the rear of the premium unit housing. As the bracket carrying portion of the chain moves upwardly, the arm 66 will, on alternate increments of chain travel, engage and tilt one of the spring positioned swivel pins 31, so as to move it to a position shown in dotted outline at 69 in Fig. 3, thereby permitting a front shelf to drop so as to dislodge its premium into chute 34 as hereinbefore mentioned. Operatively alternating therewith, the arm 68 will on the next advance of the chain engage a swivel pin 69 supporting a rear shelf so as to dislodge the premium from said rear shelf in like manner.

It will now be apparent that the chain in its upward travel will cause displacement, successively, of alternate front and rear shelves until the premium cabinet is completely empty. At this time arm 68 comes into engagement with a stop member 70 carried on the housing 26, with the following result.

Shaft 47 is provided with a suitable lost motion device, such as an automatic clutch 71, the shaft being cut at this point and the corresponding cut faces carrying engaging clutch members. The tension between the mating faces of the clutch is adjusted so that ordinarily any rotational movement applied to one clutch face is imparted to the other, but when the driven member comprising the chain and sprocket is obstructed as by the stop member 70, the mating clutch faces slide on each other, and the premium unit is thereafter, in effect, inoperative until a service operator retracts the chain to the point where arms 66 and 68 are below the lowermost premium shelf; the operator also refills the shelves for further operation.

I have set forth the operation of the premium wheel under the manual operation of one merchandising unit, the motive effect being transmitted from knob 24 through gears 38 and 39, shaft 40, gears 42 and 43, and premium wheel 52, and I have further explained that the premium wheel drives shaft 47 through the intervention of keys 54 placed in haphazard positions on the premium wheel, so that, in an actual example, if there are 50 possible key positions but only 10 keys are distributed over these 50 positions, then during 50 impulses imparted to the premium wheel by 50 purchases from either or both merchandising units there will be 10 premiums delivered but the specific time of delivery will be apparent only by access to the interior of the machine, and may be predetermined only by the service operator.

The mechanism, as so far described, could be incorporated in an embodiment such as shown in Fig. 8 which consists of a single merchandising unit in a housing 130 and a single premium unit in a housing 131. In the embodiment shown in Figs. 1 to 7, however, there is shown a second merchandising unit which functions exactly in the manner described hereinabove, namely by transmitting impulses to the premium wheel through shafts and gearing similar to the mechanism already described. In a unit of this nature, therefore, a purchaser from either of the merchandising units, in obtaining his commodity, advances the premium wheel a like increment, and his prospect of obtaining a premium is not lessened by his choice of the merchandising unit. An assembly of a plurality of merchandising units may thus be combined to operate one premium wheel, affording a wider choice of commodity containers from which to choose. A skilled mechanic might also, after examining the present disclosure, provide merchandising units in an assembly where some units are operated by coins of different denominations than others, the profit sharing prospects being equitably apportioned by gear substitutions which would advance the premium wheel a proportionately greater amount in this case of a coin purchase of higher denomination. For example, the machine could be readily altered so that while a one cent purchase advanced the premium wheel one increment, a five cent purchase from another unit in the assembly would advance the premium wheel five, or perhaps more, increments, thereby offering greater incentive for the larger purchase. I have provided, and will later describe, an embodiment for this purpose comprising, however, two premium wheels.

In the embodiment so far shown and described, the rear set of shelving may be omitted although by its use the carrying capacity of the machine shown has been doubled.

I have further provided a construction, illustrated specifically in Figs. 1, 2 and 4, whereby the premium unit described above may be operated as a merchandising unit either with or without conjoined premium operation. I have provided the vending machine with a coin slot 132 and a knob 72 which ordinarily (under premium operation as above described) are covered by a plate member 73 as indicated by the dotted line 74 in Fig. 1. Knob 72 rotates a shaft 75 which carries affixed thereto a bevel gear 76. This gear meshes with a corresponding bevel gear 77 on shaft 47, so that an actuation of the knob in conjunction with the insertion of a coin directly effects a rotation of shaft 47 and consequently an increment advance of chain 63 so as to release an article from a shelf 29 through the medium of operation of the shelf tipping mechanism hereinabove described. If it be desirable to operate solely as a coin operated merchandising device, plate 73 is removed and the keys 54 may be removed from the premium wheel. The unit 21, however, will serve simultaneously as a coin operated or premium dispensing device if the machine is arranged for premium operation as originally described while it is also equipped for coin operation without interfering with premium actuations as described with relation to Figs. 1 to 7.

It is therefore obvious that the device so far described is readily adapted to the following three methods of operation.

(A) It may be operated as an assembly comprising at least one unit actuated solely by coin insertion and at least one unit operating solely, at intermittent periods, to distribute premiums, so as to constitute a profit sharing system.

(B) It may be operated as an assembly comprising at least one unit actuated solely by coin insertion, and at least one unit operating, at intermittent periods, to distribute premiums, said later unit being also susceptible of coin operation of merchandise whenever desired.

(C) It may be operated as an assembly comprising a plurality of units, all being solely coin operated for the vending of any desired merchandise from the units as above described.

Fig. 7 shows, in vertical elevation, slightly in perspective, the appearance of the shelved section of an empty premium unit when the shelves have been tilted downwardly as hereinbefore described. It may be observed that the shelves, in successively assuming their tilted position, present a shingled, overlapping relationship, which exposes to view from the front a part of each shelf the area of which is determinable by the sparing between shelves. This exposed area may suitably be utilized as advertising space for instance by providing each shelf with slots 77, as shown. The corners of rectangular cards bearing any desired legend such as advertising matter or instructive notations may be inserted in said slots. The cards are not readily visible when the shelf is in horizontal position, but are immediately exposed when the shelf drops, and remain in view until the premium compartment is refilled. The topmost shelf may appropriately carry a notice that the compartment is empty, with instructions on how to summon the service operator. This card may also carry a notice that prespective purchasers may continue to insert coins and thereby purchase merchandise from the regular merchandising units, but, for the time being, they do not enjoy the profit sharing feature, until such time as the service operator reloads the premium shelves.

*Partial electrical operation*

Figs. 9 and 10 are views of an embodiment similar in many respects to that shown in Figs. 1 to 7, but differing to the extent that sprocket wheel 62, chain 63, and certain associated mechanism already described have been dispensed with in the present instance. I have substituted electrically energized means for tilting the shelves as will now be explained.

Referring first to Fig. 9, shaft 47 is rotated at intermittent periods by means of a ratchet and pawl, motivated by keys on premium wheel 52 as already described, said mechanism not being shown in Fig. 9, reference being had to Figs. 2, 5, and 6 for this purpose.

A multiple contact disc, 78, is affixed to the inner cabinet wall, and carries thereon a plurality of contact points 79, the number corresponding to that of a plurality of solenoids 80 (or electromagnetic devices of similar nature) having movable cores 80a, each core being held in advanced position by pressure of a spring (not shown) so as to support the free edge of a hinged shelf 29.

A traveling contact arm is fixed to shaft 47, and on each increment of rotation of shaft 47 the contact arm advances to the next contact point thereby completing a circuit through one of the solenoids so as to retract its shelf-supporting core 80a, thereby permitting the shelf to drop and deliver a premium or vendible commodity as hereinabove fully described. A simple wiring diagram for two solenoids is shown in Fig. 10. The lead to the contact arm may conveniently be arranged by means of a ring 82 and brush 83, while a multiple strand cable 84 carries the leads for the various contact points.

To prevent continuous energization of a solenoid the positioning of contact arm 81 on shaft 47 by set screw 47a is so arranged that the arm travels slightly past the point of registry with a contact point 79, the circuit being completed only momentarily, but nevertheless sufficiently long to withdraw the shelf support. To facilitate this arrangement the contact arm may be set with a sliding pressure contact which will tend to carry it naturally into a depression in the path of travel between contact points, or such arrangement may be effected by a spacing or stop device attached to shaft 47, such as shown in Figs. 11 and 13 on shaft 80.

Complete electrical operation

Figs. 11, 12 and 13 illustrate an embodiment wherein shaft 47 serves merely as the upper sustaining member for T couplings to hold the upper ends of gear shafting soon to be described. The ratchet and pawl mechanism is rearranged to conform with a more complete electrification of the device, and, as in the previously described embodiment, the sprocket and chain are dispensed with, being replaced with solenoid shelf tipping arrangements as already disclosed.

For convenience the unit will be described with reference to an assembly such as shown in Fig. 1 wherein two merchandising units are combined with a central premium unit, the operating mechanism for the assembly being shown in Figs. 11 to 13.

The merchandising unit knob 24 causes operation of gears 38 and 39 and vertical shaft 40 in the manner already described. Referring now to Figs. 11, 12 and 13, shaft 40 carries a gear 85 which meshes with a gear 86 carried on shaft 87. Gear 86 is provided with means for carrying a number of keys 88, several being shown, and substantially corresponds to the premium wheel of the earlier described machine. These keys may conveniently be pegs placed in bored apertures, or may be otherwise positioned or attached. Operation of the merchandising unit progressively rotates gear 86 until a key 88 abuts an arm 89 swingably mounted on shaft 90. Arm 89 has pivotally mounted thereon a pawl 91 in engagement with a ratchet wheel 92 which is affixed to shaft 90. The rotary motion imparted to shaft 90 by the ratchet and pawl swings a contact arm 93 which is also firmly fixed to shaft 90. Said contact arm is mounted for circular travel on a contact disc carrying a plurality of contact points 95. Contact arm 93 (Fig. 11) has a downwardly projecting contact pin 93a which is adapted to slidably travel over points 95. A peg 96 projects downwardly from arm 93 and carries a follower device 97 disposed to slidably engage the periphery of an annular disc member 101 which is provided with a number of smoothly curved projections 98 and depressions 99 corresponding to the number of contact points 95 on disc 94. A compressed coil spring, 100, maintains the follower in contact with the disk periphery, whereby arm 93 will come to rest at a location between contacts. Arm 93 completes a circuit through solenoid coils, not now shown but similar in all respects to those illustrated in Fig. 9, so as to successively tip the premium shelves as explained above. No wiring diagram is shown for the device illustrated in Figs. 11 and 12, since the contact arm 93 and disc 94 cooperate with successive solenoid coils as shown in Figs. 9 and 10 and described in connection therewith. A cable carries insulated strands of conductor, one from each contact point 95 to a corresponding solenoid, and a single return lead is connected to the contact arm, the line current being introduced at any convenient point in the return lead.

The device shown in Figs. 11 and 12 comprises two merchandising units, each one associated with the operation of the arm 89, ratchet 92, pawl 91 and contact arm 93, as described with reference only to one merchandising unit. Operation of either merchandising unit serves to advance the key-carrying wheels 86 and 102 and each of said wheels brings keys into occasional abutment with the pawl-carrying arm 89 so as to advance the contact arm as aforesaid. Members 94 and 101, namely, the contact disc and the stop member for the contact arm 93, are fixed with respect to each other and to the base, shaft 90 rotating freely in bored apertures therein and in T coupling 103. Ratchet 92 and contact arm 93 are of course attached to shaft 90. Arm 89 swings on shaft 90, being returnable to an original position by a spring attached to the shaft, and, for simplicity, not shown.

Mechanical operation with a plurality of premium wheels

Figure 14:
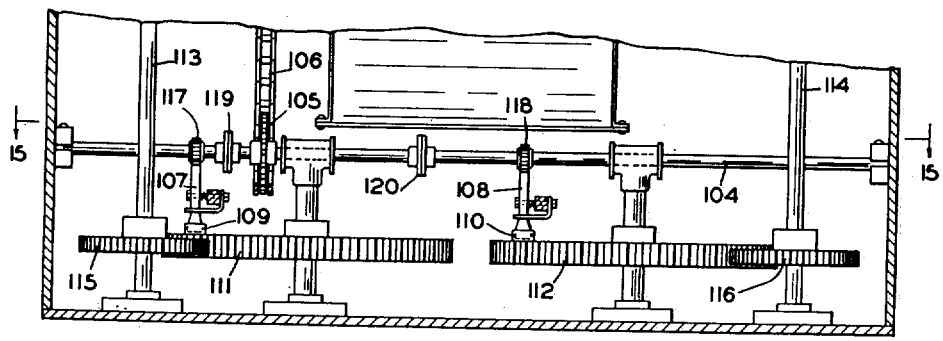
Fig. 14 is a fragmentary front elevation, with cover removed, of the lower portion of still another embodiment of my invention, showing a gearing arrangement for an assembly having two separate premium wheels operatively associated with the same premium unit.

Figs. 14 and 15 illustrate a further embodiment of my invention wherein a mechanically operated assembly may be provided with a plurality of premium wheels, all operating a single premium unit. A significant advantage to the use of a unit of this nature is that the separate merchandising units may be operated by coins of varying denominations, one for example being a penny machine and another a nickel machine, etc. The advantage of this feature is that in the premium wheel corresponding to the coin of higher denomination, the service operator may distribute a larger number of actuating keys to insure the vending of a greater value or number of profit sharing items.

The operation of the device may be readily understood from the description already given with reference to the previous embodiment illustrated in Figs. 1 to 7. Shaft 104 operates the chain sprocket 105 and chain 106 so as to tip the premium shelves. In the present embodiment two swinging arms 107 and 108 are actuated respectively by keys 109 and 110 on discs 111 and 112. Shafts 113 and 114 are operated by knobs (not shown) on the merchandising units and they in turn rotate premium wheels 111 and 112 through intermediate gears 115 and 116 respectively. The ratchet and pawl arrangement to communicate the swinging movement of arms 107 and 108 to the shaft 104 are indicated generally at 117 and 118 but are not shown in detail in view of the thorough discussion of this feature in connection with Figs. 1 to 7. In the present instance two friction clutches 119 and 120 or any practical lost motion device may provide for lost motion between the chain sprocket and the ratchet wheels when the shelves are empty.

Assuming that disc 112 is the premium wheel corresponding to the coin of highest denomination, the service operator is enabled to distribute an equitably proportioned larger number of keys 110 on the disc face so as to increase the number or value of profit sharing items to the purchaser during operation of this unit. The number of keys which may be distributed for a complete rotation of the disc rests wholly within the discretion of the operator in consideration of the percentage of the profits which he may return to the customer while retaining a proper operating margin.

A device may be provided for sounding a gong or otherwise audibly informing the operator that a premium is about to be delivered. Such a device, while adaptable with suitable modifications to all embodiments, is shown as applied to the machine illustrated in Fig. 4. It comprises an arm 121 pivotally mounted at 122 and having its lower end 123 in position to engage a gong 124 which may be suspended from the cabinet top or otherwise suitably mounted. The upper end of the arm engages a ratchet affixed to the chain sprocket, said ratchet (not shown) communicating an impulse to the arm at each increment of advance of the chain so as to sound the gong simultaneously with the premium delivery.

Sufficient embodiments of the invention have been shown and described to illustrate the fact that the invention may be embodied in an extremely simple and trouble-proof construction which is adaptable to mechanical operation, manually actuated, or, to varying extents, to combined mechanical and electrical operation. It is of course possible to make the operation completely electrical to the extent that the insertion of a coin completes a circuit, and, with the addition of electrical power devices such as electrical motors, etc., thereby actuates trains of gearing or other electrical devices which can be set up by any skilled electrician after a study of the devices herein shown.

What I claim is:

1. In a vending machine comprising at least one coin operated unit, a premium dispensing unit including at least one premium-bearing, hinged shelf, supporting means for maintaining said shelf in horizontal position, a rotatable premium wheel disposed to operate through successive increments of travel on successive respective operations of said coin operated unit, a key carried by said premium wheel, a movable arm in the path of travel of said key, a pawl carried by said arm, a ratchet wheel in engagement with said pawl, a rotatable shaft affixed to said ratchet wheel, and means operatively associated with said shaft and with said shelf supporting means for intermittently withdrawing said shelf supporting means wherever said movable arm is engaged by said key, so as to intermittently drop said shelf and deliver a premium to the operator of said coin operated unit.

2. In a vending machine comprising at least one coin operated unit, a premium dispensing unit including at least one premium-bearing, hinged shelf, electrically energized shelf supporting means for maintaining said shelf in horizontal position, a rotatable premium wheel disposed to operate through successive increments of travel on successive respective operations of said coin operated unit, a key carried by said premium wheel, a movable arm in the path of travel of said key, a pawl carried by said arm, a ratchet wheel in engagement with said pawl, a rotatable shaft affixed to said ratchet wheel, and means operatively associated with said shaft including a sliding contact arm carried by said shaft over a succession of contact points so as to actuate said electrically energizable supporting means and intermittently withdraw said shelf supporting means whenever said movable arm is engaged by said key, so as to intermittently drop said shelf and deliver a premium to the operator of said coin operated unit.

3. In a vending machine comprising at least one coin operated unit, a premium dispensing unit including at least one premium-bearing, hinged shelf, supporting means for maintaining said shelf in horizontal position, a rotatable premium wheel disposed to rotate through fractional increments of rotation on successive operations of said coin operated unit, trip means carried by said wheel at irregularly spaced locations on the periphery of said wheel, and means sensitive to contact with said trip means and disposed, on said contact, to withdraw said shelf supporting means whereby said shelf drops and delivers said premium to an operator.

4. In a vending machine comprising at least one coin operated unit, a premium dispensing unit including at least one premium-bearing, hinged shelf, supporting means for maintaining said shelf in horizontal position, a rotatable premium wheel disposed to rotate through fractional increments of rotation on successive operations of said coin operated unit, a plurality of keys carried by said wheel at irregularly spaced locations around the periphery thereof, and means sensitive to contact with any one of said keys and disposed, on said contact, to withdraw said shelf supporting means whereby said shelf drops and delivers said premium to an operator.

5. In a vending machine comprising at least one coin operated unit, a premium dispensing unit including at least one premium bearing shelf, supporting means for normally maintaining said shelf in horizontal position said means including an electrically energizable solenoid and a plunger responsive to energization of said solenoid, a rotatable premium wheel disposed to rotate through successive increments of travel by respectively successive operations of said coin operated unit, trip means carried by said wheel at irregularly spaced locations on the periphery of said wheel, and a plurality of spaced electrical terminals and a contacting means movable relatively thereto, said relative movement of the contacting means being responsive to advance of said trip means from a starting point, whereby a solenoid is intermittently energized to withdraw said shelf supporting means and deliver a premium to the operator during some only of said increments of travel.

6. In a vending machine comprising a plurality of coin operated units, a premium dispensing unit including at least one premium bearing shelf, shelf supporting means for maintaining said shelf in premium retaining position, means for tipping said shelf whereby the premium contained thereon may be delivered to the operator, a plurality of premium wheels, one respectively operatively associated with each of said coin operated units, each said premium wheel disposed to rotate through fractional increments of rotation on successive operations of its respective coin operated unit, trip means carried by each said wheel at irregularly spaced locations on the periphery thereof, and means sensitive to passage thereby of said trip means and disposed, on contact with any of said trip means, to withdraw said shelf supporting means whereby said shelf is tipped so as to deliver a premium to the operator.

7. In a vending machine of the type wherein an article of merchandise is dispensed responsive to each successive insertion of a coin therein, a unit for intermittently dispensing a premium distinct from such article of merchandise, means in said premium dispensing unit for releasably retaining said premium, and means responsive to a predeterminable number of said coin insertions and operatively associated with said premium retaining means, whereby said premium retaining means is rendered inoperative at each such response and a premium is delivered after each such predeterminable number of coin insertions.

8. A vending machine comprising at least one coin operated unit, a premium dispensing unit, said premium dispensing unit including at least one premium retaining member, said member being movably mounted but normally maintained in premium retaining position, and operatable means adjacent said member and disposed, when operated, to control movement of said member to release said premium for delivery to an operator, said operatable means being intermittently responsive, at preestablished but irregular intervals, to operation of said coin operated unit.

9. A vending machine comprising at least one coin operated unit, a premium dispensing unit, said premium dispensing unit including at least one premium retaining member, said member being movably mounted but normally maintained in premium retaining position, a rotatable premium wheel disposed to rotate through fractional increments of rotation on successive operations of said coin operated unit, trip means carried by said wheel, and operatable means sensitive to contact with said trip means and disposed, when operated, to control movement of said premium retaining member to dislodge said premium for delivery to an operator.

TROY E. STAIR.